Figure 1:
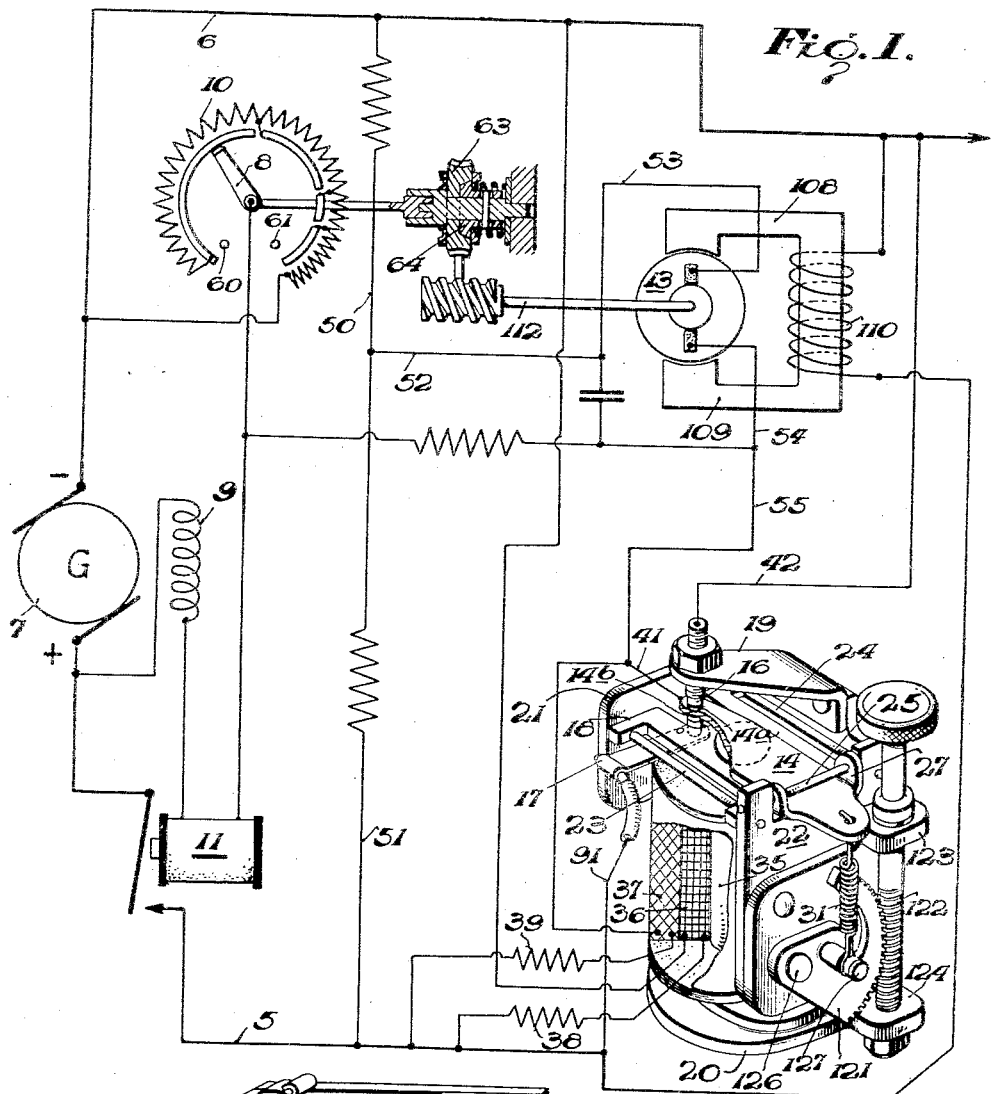

June 9, 1942.    J. W. ALLEN    2,285,397
ELECTRICAL APPARATUS
Filed March 10, 1941

INVENTOR
Joseph W. Allen.
BY Martin J. Finnegan.
ATTORNEY

Patented June 9, 1942

2,285,397

UNITED STATES PATENT OFFICE 2,285,397

ELECTRICAL APPARATUS

Joseph W. Allen, East Orange, N. J., assignor to Bendix Aviation Corporation, South Bend, Ind., a corporation of Delaware Application March 10, 1941, Serial No. 382,673

2 Claims. (Cl. 171—229)

This invention relates to dynamo electric machines, and particularly to the regulation of the voltage across the output lines of a dynamo electric machine.

Direct current generators whose capacity is sufficiently high to require field current flow in excess of a few amperes present a problem in voltage output regulation which is not satisfactorily met by use of vibrating regulators connected in the manner that has become standard in automotive vehicle installations which—until a very recent date—did not involve generator loads in excess of, say, fifty amperes, or voltage outputs in excess of fifteen to thirty volts.

Recent developments in the automotive field, particularly in the design of buses, aircraft and marine craft to transport heavier loads under power developed by internal combustion engines, have involved constantly increasing demands for generation of more electrical power by use of engine-driven generators of higher capacities than heretofore. The result has been to create a problem in satisfactory voltage regulation.

As a proposed solution of this problem it is an object of the present invention to provide a generator system in which the vibrating regulator operates upon the shunt field only indirectly, and in such manner that its contacts are outside the shunt field circuit and therefore do not have to carry the relatively heavy field current.

A further object is to provide, for generator voltage regulation, an automatically operated rheostat which varies the strength of the generator field immediately upon the occurrence of a rise or fall in line voltage, and then holds the new setting steadily, the operation of the rheostat being under the control of a voltage-responsive vibratory regulator.

In the preferred embodiment shown in the accompanying drawing, the rheostat is operated by an electric motor, the armature of which is connected in series with the armature of the vibratory regulator, and in such manner that both said armatures are located in the common central portion of a network of connections across the output terminals of the generator whose voltage is to be regulated, wherefore current may flow through the windings of the motor armature in opposite direction, alternately, and thereby cut resistance in and out, alternately, in the rheostat section of the generator field circuit. It is to be understood, however, that the maintenance of the electrical connections precisely as shown is not essential, the drawing being illustrative rather than definitive of the scope of the invention.

Other objects include mechanical features of the rheostat, the rheostat drive, the driving motor, and the vibratory regulator, and will become apparent from inspection of the following specification when read with reference to the accompanying drawing wherein is illustrated the preferred embodiment of the invention. It is to be expressly understood, however, that the drawing is for the purpose of illustration only, and is not designed as a definition of the limits of the invention, reference being had to the appended claims for this purpose.

Figure 2:
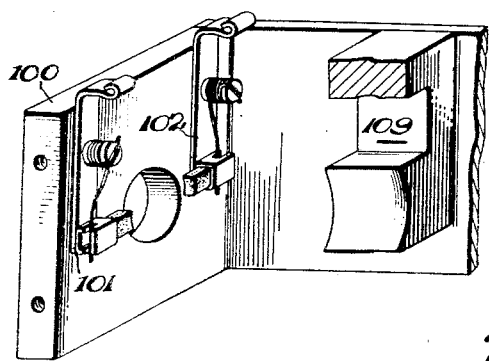

In the drawing,

Fig. 1 is a diagram of the electrical connections involved in the preferred embodiment of the invention, with certain of the actuating elements being shown in mechanical section; and Fig. 2 is a view in perspective of a portion of the box which houses the voltage regulating motor.

In Fig. 1 reference characters 5 and 6 designate the two sides of the circuit supplied by the generator 7, and numeral 8 designates the rotating contact arm of a rheostat forming part of the shunt field circuit of the generator, and therefore connected in series with the field windings 9 and the circuit-protecting relay 11. The rheostat arm 8 is adapted to be rotated first in one direction and then the other, in response to the rotation of a reversing electric motor 13; the reversals of said motor being under the control of an electromagnetic assembly 29 mounted on a suitable insulating panel (not shown); the armature 14 of the assembly having a contact 14ᵃ adapted to engage a stationary contact 16, and a second contact 14ᵇ adapted to engage a stationary contact mounted directly under the contact 14ᵇ on a strip 17 secured to (but insulated from) the H-shaped iron plate 18 which fits between the parallel iron plates 21 and 22 of the magnet assembly and is secured thereto by pins 23, 24. A third pin 25 is journaled in the upper extensions of plate 22 and receives the ears 27 of the armature 14, wherefore the said armature 14 has pivotal suspension for oscillation between the contacts 16 and 17. A coiled spring 31 holds the armature balanced mid-way between the contacts 16 and 17, and out of engagement therewith, so long as the voltage across lines 5 and 6— that is, across the output terminals of the generator 7—remains at the rated value; the tension of the spring being adjustable to assure such balancing of the armature 14, and the adjusting means having certain novel features hereinafter described.

In order to make the armature 14 of the motor energizing magnet responsive to deviations from normal voltage, I place upon its core 35 a pair of windings 36 and 37, the former of which is connected (along with its resistor 38) directly across the lines 5 and 6. The winding 37 is also (along with its resistor 39) connected directly across the lines 5 and 6, but only by way of the normally open contacts 14ª, 16 to which leads 41, 42, respectively, are connected. Because of this difference in hook-ups, it follows that the magnetic (downward) pull upon armature 14 will be constant so long as the voltage across lines 5, 6 is constant; will decrease when the voltage across lines 5, 6 drops below normal, thus allowing spring 31 to swing the armature upward to engage contacts 14ª with 16; and will thereupon tend to increase by reason of the direct connection thus established between outer winding 37 and the wire 42 leading to the negative side of the line. Whether this increase will be sufficient to offset instantly the effect of spring 31 will depend upon how far below normal the voltage across the lines 5, 6 has dropped. In any event, the closure of contacts 14ª and 16 will have brought about an energization of the armature windings of the motor 13 and a consequent rotation of the rheostat arm 8 in a clockwire direction; the circuit through the motor 13 being traceable from positive side 5 by way of wires 51, 52 and 53, and back to the negative side by way of wires 54, 55, 41 and 42; the two last-named being connected by the engagement of contact 14ª with contact 16. The resulting clockwise rotation of arm 8 operates to reduce the amount of resistance in the shunt field circuit of generator 7; hence said field circuit is strengthened and the generator voltage restored toward normal. Restoration toward normal voltage will have a strengthening effect on the magnetic circuit of windings 36 and 37, and the resulting increase in the downward pull on armature 14 should cause a reopening of the contacts 14ª and 16, thus breaking the motor circuit and bringing rheostat arm 8 to rest; but if for any reason the contacts 14ª, 16 do not immediately separate, the rheostat arm 8 will eventually be brought to rest by contact with stop 61, at which time the increased resistance to rotation will cause friction clutch 63, 64 to slip, and such slipping will continue until the motor circuit is interrupted.

Should the voltage rise above the normal value, the increased downward pull will tend to move contact 14ᵇ (on the under side of armature 14) against the contact on insulated strip 17, and when these two come together the motor armature will receive current in the opposite direction, wherefore rheostat arm 8 will move in a counterclockwise direction to insert more resistance in the shunt field circuit and correspondingly lower the voltage back toward normal; the circuit to the motor now passing from positive feed 5 by way of wire 91, and contacts 17 and 14ᵇ, to wires 41, 55 and 54, and returning to the generator by wires 53, 52 and 50. Upon restoration of normal voltage the spring 31 will restore the armature 14 to its neutral (mid) position, thus deenergizing motor 13.

As the motor 13 need not be of any larger size than is necessary to operate the arm 8 and the reduction gear train (and slipping clutch) leading thereto, it can conveniently be mounted in a box-like frame to be carried by the same mounting panel as that which receives the motor energizing magnet 20, the relay 11, the rheostat 10, and the gear train of which the clutch elements 63, 64 form component parts. To this end I propose to mount, on one side 100 of such a box-like frame, a pair of brush receiving strips 101 and 102 (Fig. 2), and on the adjacent sides I mount the legs 108 and 109 (Fig. 1) of the field structure which receives the field winding 110. The side 100 is centrally apertured to receive a suitable bearing (not shown) to support one end of the motor armature assembly, and the opposite side is also apertured to allow passage therethrough of the shaft 112 (Fig. 1) which is driven from the motor armature. These box sides may be of any suitable material, and if of insulating material there will be a saving, as certain other insulating means may be dispensed with.

The adjusting means for spring 31 of the motor energizing magnet includes a sector 121 and a screw 122 meshing therewith; the screw 122 being mounted in brackets 123 and 124 of the magnet assembly, and the sector 121 being pivotally mounted as indicated at 126. A post 127 is located on the sector 121 at a point which is spaced from the pivot 126, but substantially on the radial line passing from the pivot center to the point of tooth contact of members 121 and 122. This post 127 serves as the anchorage for spring 31, and because of its location on the radial line just referred to, it operates to vary the spring tension in response to every turn of screw 122; the teeth of sector 121 being held firmly in mesh with the screw 122 by the resilient action of the tooth-bearing portion of the sector.

What is claimed is:

1. In combination with a generator and a rheostat for controlling the voltage of the former, an electric motor energizable from said generator to vary the resistance setting of said rheostat, means for producing such energization whenever necessary to maintain constant voltage across the generator terminals, said energizing means comprising two contacts leading to opposite sides of the generator circuit, and means for selectively connecting one or the other of said contacts in circuit with said motor to energize the latter with current from the generator circuit, said connecting means including an electro-magnet whose magnetic circuit is responsive to any deviation from normal voltage across said generator terminals, and an armature in the magnetic circuit of said electro-magnet, said armature being a part of said motor circuit.

2. In combination with a generator and a rheostat for controlling the voltage of the former, an electric motor energizable from said generator to vary the resistance setting of said rheostat, means for producing such energization whenever necessary to maintain constant voltage across the generator terminals, said energizing means comprising two contacts leading to opposite sides of the generator circuit, and means for selectively connecting one or the other of said contacts in circuit with said motor to energize the latter with current from the generator circuit, said connecting means including an electro-magnet whose magnetic circuit is responsive to any deviation from normal voltage across said generator terminals, an armature in the magnetic circuit of said electro-magnet, said armature being a part of said motor circuit, and means normally balancing said armature in an intermediate position between, and out of engagement with, said two contacts.

JOSEPH W. ALLEN.